(12) United States Patent
Tachibana et al.

(10) Patent No.: US 10,853,600 B2
(45) Date of Patent: Dec. 1, 2020

(54) CODE READING DEVICE AND CODE READING METHOD

(71) Applicant: ITOH DENKI CO., LTD., Kasai-shi, Hyogo (JP)

(72) Inventors: Toshiyuki Tachibana, Himeji (JP); Yoshiyuki Kujihashi, Kato (JP); Hirotaka Yamakaze, Takasago (JP)

(73) Assignee: Itoh Denki Co. Ltd., Hyogo (JP)

( * ) Notice: Subject to any disclaimer, the term of this patent is extended or adjusted under 35 U.S.C. 154(b) by 0 days.

(21) Appl. No.: 16/165,073

(22) Filed: Oct. 19, 2018

(65) Prior Publication Data

US 2019/0205584 A1 Jul. 4, 2019

(30) Foreign Application Priority Data

Dec. 28, 2017 (JP) ................. 2017-254919

(51) Int. Cl.
*G06K 7/10* (2006.01)
*G06K 7/14* (2006.01)
*B65G 47/49* (2006.01)

(52) U.S. Cl.
CPC ....... *G06K 7/10722* (2013.01); *B65G 47/493* (2013.01); *G06K 7/14* (2013.01); *G06K 7/1413* (2013.01); *B65G 2203/044* (2013.01)

(58) Field of Classification Search
CPC .. B65G 13/10; B65G 17/24; B65G 2203/041; B65G 2203/042; B65G 2207/34; G06K 7/10861; G06K 7/10871; G06K 7/1413; G06K 7/1417
See application file for complete search history.

(56) References Cited

U.S. PATENT DOCUMENTS

| | | | |
|---|---|---|---|
| 3,642,117 A | 2/1972 | Burt | |
| 4,717,026 A * | 1/1988 | Fischer | ..................... B07C 5/02 |
| | | | 194/205 |
| 4,832,173 A * | 5/1989 | Hattori | .................. B07C 5/3408 |
| | | | 198/377.1 |
| 5,161,661 A * | 11/1992 | Hammond | ............ G07F 7/0609 |
| | | | 194/209 |

(Continued)

FOREIGN PATENT DOCUMENTS

EP 0412351 A1 2/1991
FR 2 234 831 A5 1/1975

(Continued)

OTHER PUBLICATIONS

Search Report dated Mar. 20, 2019 in Application No. GB1817076.1.

(Continued)

*Primary Examiner* — Christopher Stanford
(74) *Attorney, Agent, or Firm* — Wood, Phillips, Katz, Clark & Mortimer

(57) ABSTRACT

A code reading device including: an article placement surface on which an article is placed; at least one code reading unit that optically reads a code attached to the article; and a motion unit that causes the article to swivel and/or rotate on the article placement surface, the code reading device being configured to read the code with the code reading unit while causing the article to swivel and/or rotate on the article placement surface.

14 Claims, 15 Drawing Sheets

(56) References Cited

U.S. PATENT DOCUMENTS

| | | | | |
|---|---|---|---|---|
| 5,177,368 A * | 1/1993 | Kay | ........................ | G06K 1/121 250/566 |
| 5,252,814 A * | 10/1993 | Tooley | ................ | G06K 7/10871 186/61 |
| 5,384,450 A * | 1/1995 | Goetz, Jr. | .......... | G06K 7/10861 235/383 |
| 5,495,097 A * | 2/1996 | Katz | .................. | G06K 7/10633 235/462.12 |
| 5,921,374 A * | 7/1999 | Takino | ................... | B65G 47/54 193/35 MD |
| 5,934,440 A * | 8/1999 | Kroghrud | ............... | B07C 5/126 194/212 |
| 6,002,125 A * | 12/1999 | Schubert | ................ | B25J 9/1697 250/223 R |
| 6,073,747 A * | 6/2000 | Takino | ................... | B65G 13/10 198/370.09 |
| 6,431,343 B1 * | 8/2002 | Lehtola | ................ | B65G 47/248 198/395 |
| 6,571,937 B1 * | 6/2003 | Costanzo | ............... | B65G 13/10 198/370.03 |
| 6,776,279 B2 * | 8/2004 | Krull | ...................... | B65G 47/24 198/626.1 |
| 6,889,815 B2 * | 5/2005 | Kanamori | ............ | B65G 1/0478 198/369.4 |
| 6,968,941 B2 * | 11/2005 | Fourney | ................. | B65G 17/08 198/370.03 |
| 7,050,938 B1 * | 5/2006 | Prater | .................... | G06Q 10/087 702/174 |
| 8,636,137 B2 * | 1/2014 | Weber | .................... | B65G 47/24 198/456 |
| 2004/0046028 A1 | 3/2004 | Guntveit et al. | | |
| 2004/0104100 A1 * | 6/2004 | Schiesser | ............... | B65G 15/22 198/460.1 |
| 2006/0151296 A1 * | 7/2006 | Halang | ................... | B65G 17/24 198/779 |
| 2008/0035390 A1 * | 2/2008 | Wurz | ..................... | G01B 11/04 177/25.15 |
| 2008/0169171 A1 * | 7/2008 | Itoh | ......................... | B65G 13/10 198/412 |
| 2009/0173598 A1 * | 7/2009 | Fourney | ................. | B65G 17/24 198/341.01 |
| 2011/0248083 A1 * | 10/2011 | Bonner | .................... | G06K 9/00 235/375 |
| 2012/0138687 A1 * | 6/2012 | Baitz | .................. | G06K 7/10871 235/470 |
| 2012/0187195 A1 * | 7/2012 | Actis | .................... | G07G 1/0045 235/479 |
| 2015/0210483 A1 * | 7/2015 | Morency | ............... | B65G 47/244 198/411 |
| 2017/0101273 A1 | 4/2017 | Itoh et al. | | |
| 2018/0265306 A1 | 9/2018 | Wang | | |

FOREIGN PATENT DOCUMENTS

| | | |
|---|---|---|
| GB | 1 224 100 A | 3/1971 |
| JP | 2001-019147 A | 1/2001 |
| JP | 2006-199450 A | 8/2006 |
| JP | 2009-203013 A | 9/2009 |
| KR | 2016-0057752 A | 5/2016 |

OTHER PUBLICATIONS

Preliminary Search Report dated Jul. 30, 2020 in French Patent Application No. 1860182.

* cited by examiner

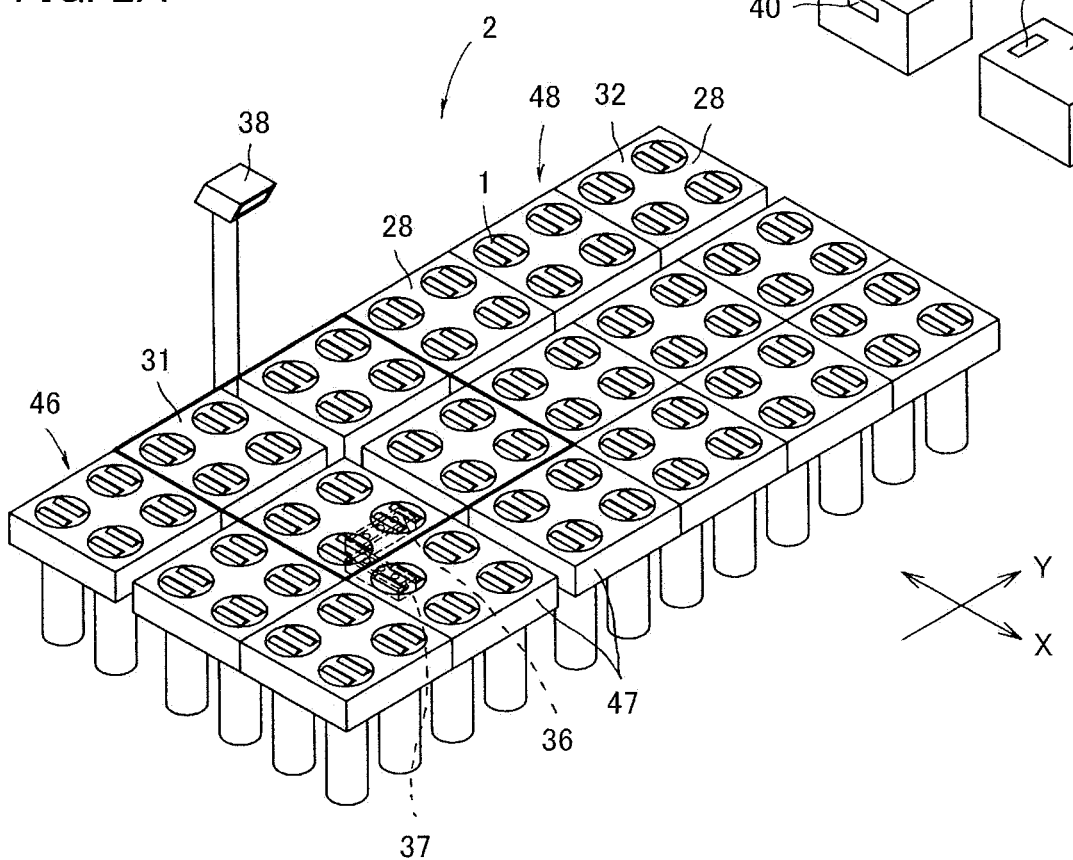

FIG. 14
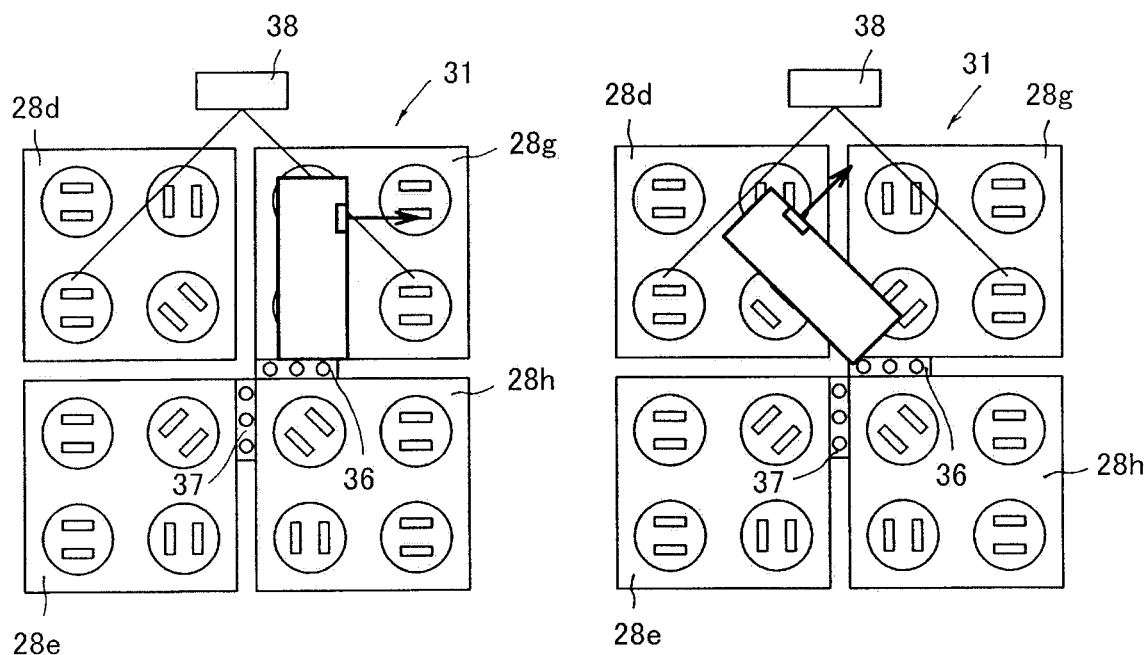
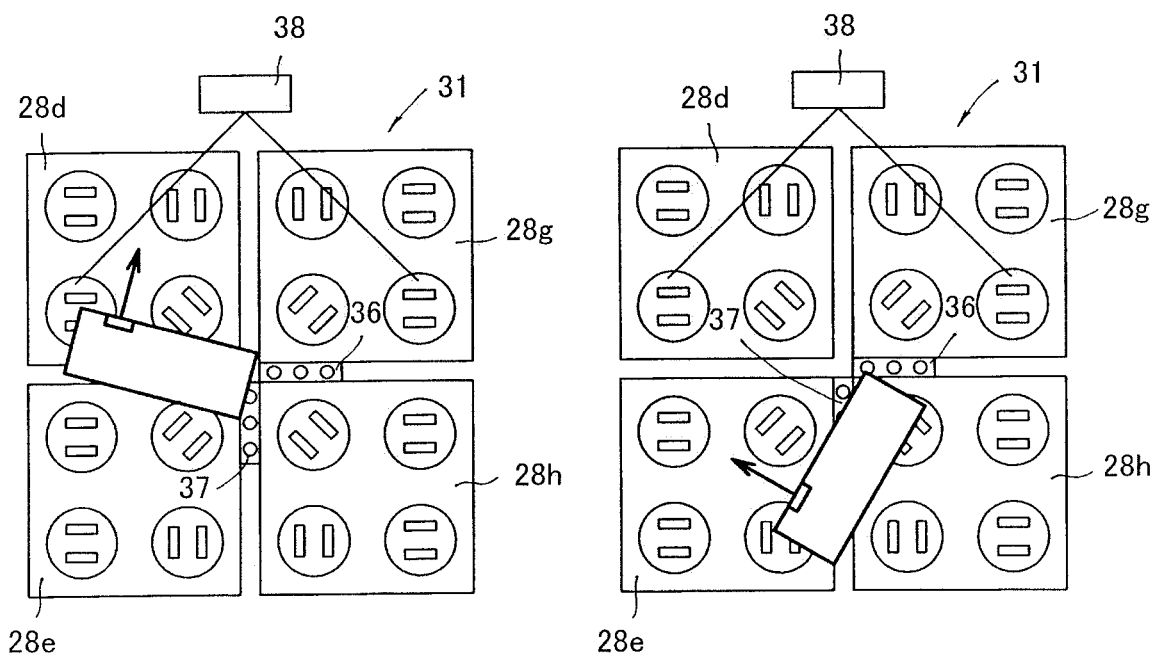

CODE READING DEVICE AND CODE READING METHOD

TECHNICAL FIELD

The present invention relates to a code reading device and a code reading method for automatically reading a barcode or the like attached to an article.

BACKGROUND ART

For example, at distribution stations for home delivery and large factories, a large number of articles are collected and sorted according to destinations. These delivery stations include pickup points for different destinations, and each article is collected at a corresponding pickup point by a conveyor line. A conveyor line in a delivery station is branched into a plurality of lines, which are connected to the respective pickup points. In addition, a code reading device is provided on a portion of the conveyor line, and a code attached to an article is read by the code reading device, so that the destination of the article is determined.

A conventional code reading device has a barcode reader attached to a normal conveyor.

That is, a conveyor line in, for example, a distribution station is generally combined with a conveyor device, such as a roller conveyor or belt conveyor, which linearly conveys articles. The conventional code reading device is configured such that a barcode reader is attached to, for example, a frame of a roller conveyor or belt conveyor that constitutes a conveyor line.

The conventional code reading device has a barcode reader on a side surface of the running path for articles. An article moves linearly on the conveyor. The article passes in front of the barcode reader mounted on the conveyor. Meanwhile, the barcode reader reads the barcode attached to the article.

Related documents include JP 2009-203013 A, JP 2001-019147 A, and JP 2006-199450 A.

SUMMARY OF INVENTION

Technical Problem

A conventional code reading device presupposes that a barcode is provided at a specific position on an article and the article passes in front of a barcode reader in a specific posture.

That is, a conventional code reading device can read a barcode, as long as a barcode reader is fixed to a side surface of a running path for an article, the barcode is attached to a side surface of the article, and the surface to which the barcode is attached faces the barcode reader. However, if the barcode is attached to another surface of the article or the surface to which the barcode is attached does not face the barcode reader, the code reading device cannot read the barcode.

Accordingly, in order to read barcodes with a conventional code reading device, the barcodes must be attached to the same surfaces of articles.

Also, when placing an article on a conveyor line, an operator needs to check the orientation of the article and manually correct the orientation.

The present invention focuses on the above-mentioned problems of the conventional technique, and provides a code reading device that can read a code attached to an arbitrary position with little constraints on a position to which the code is attached and a posture of an article.

Solution to Problem

An aspect for solving the above-mentioned problems is a code reading device including: an article placement surface on which an article is placed; at least one code reading unit that optically reads a code attached to the article; and a motion unit that causes the article to swivel and/or rotate on the article placement surface, the code reading device being configured to read the code with the code reading unit while causing the article to swivel and/or rotate on the article placement surface.

In this case, the "code" is, for example, a barcode or a two-dimensional barcode configured to record some kind of information in a graphical form.

The code reading device according to this aspect includes a motion unit that causes the article to swivel and/or rotate on the article placement surface, and causes the article to swivel and/or to rotate on the article placement surface. As a result, a plurality of surfaces of the article each face the code reading unit, although temporarily.

The code reading device according to this aspect causes the article to swivel and/or rotate on the article placement surface, and reads a code by taking an opportunity that the surface of the article to which the code is attached faces the code reading unit. Therefore, there are few constraints on surfaces to which codes should be attached. Also, regardless of the placement posture of an article, the code can be read.

The code reading unit is preferably located above the article placement surface and installed in an inclined posture.

According to this aspect, a code attached to any surface other than the bottom surface of an article can be read regardless of the placement posture of the article.

In each of the above-described aspects, the code reading unit is preferably an image code reader.

According to this aspect, a wide range is monitored by one code reading unit.

In each of the above-described aspects, it is preferable that the at least one code reading unit includes at least one lower code reading unit that reads the code from a lower side of the article placement surface, and the code reading device is configured to read the code with the lower code reading unit.

According to this aspect, even if an article is placed such that a code is attached to the bottom surface, the code can be read.

In the above-described aspect, it is preferable that the article placement surface includes a gap, and the lower code reading unit is installed in a posture to look out through the gap.

According to this aspect, it is possible to more reliably read the code attached to the bottom surface.

In the above-described aspect, it is preferable that the lower code reading unit is a scanning type barcode reader that scans along a direction in which the gap extends.

In the above-described aspect, it is preferable that the at least one lower code reading unit includes a plurality of lower code reading units, and the lower code reading units coexist in postures in different scanning directions.

According to this aspect, it is possible to more reliably read the code attached to the bottom surface.

In each of the above-described aspects, it is preferable that the article placement surface includes a plurality of conveyance cells arranged in a planar state, and each conveyance cell has a moving function of moving the article and a conveying direction change function of changing a conveying direction.

According to this aspect, the article can be caused to swivel or rotate smoothly.

In each of the above-described aspects, it is preferable that the code reading device includes a code reading area that allows the article to swivel and/or rotate, and when the code is read, the article is discharged from the code reading area.

According to this aspect, it is possible to save wasteful time after a code is read.

In each of the above-described aspects, it is preferable that the code reading device includes: a code reading area that allows the article to swivel and/or rotate; and a retreat area, and when the code is not read within a predetermined time in the code reading area, the article is temporarily placed in the retreat area and returned to the code reading area afterward.

According to this aspect, it is possible to save wasteful time when a code cannot be read. Also, an article is returned to the code reading area again, and the reading of the code is executed again.

In each of the above-described aspects, the at least one code reading unit may include an upper code reading unit and a side code reading unit, the upper code reading unit may be configured to read a barcode provided on an upper surface of the article, and the side code reading unit may be configured to read the barcode provided on a side surface of the article.

An aspect is a code reading device including: an article placement surface on which an article is placed; at least one code reading unit that optically reads a code attached to the article; and a motion unit that causes the article to swivel and/or rotate on the article placement surface, the code reading device being configured to read the code with the code reading unit while causing the article to swivel and/or rotate on the article placement surface, the at least one code reading unit including an upper code reading unit and a lower code reading unit, the upper code reading unit being provided above the article placement surface, the lower code reading unit being configured to read the code by monitoring from below the article placement surface.

An aspect of a method is a method for reading a code attached to an article, including: (a) swiveling and/or rotating the article; and (b) reading the code from an upper surface side and a bottom surface side of the article.

In the above-described aspect, it is preferable that step (a) includes swiveling and/or rotating the article on an article placement surface having a gap, and step (b) includes reading the code from the bottom surface side through the gap.

Effect of Invention

According to a code reading device and a code reading method according to the present invention, a code attached to an arbitrary position can be read with little constraints on a position to which the code is attached and a posture of an article.

BRIEF DESCRIPTION OF DRAWINGS

FIG. 2A is a perspective view of the conveyance device in FIG. 1, and FIG. 2B is a perspective view of an article.

FIGS. 10A and 10B each are a plan view showing a posture and a biasing direction of a conveying roller in the code reading area, in which FIG. 10A shows a state when a code is read, and FIG. 10B shows a state when code reading is completed.

FIGS. 11A and 11B each are a plan view showing the posture and the biasing direction of the conveying roller in the code reading area, in which FIG. 11A shows a state when code reading fails, and FIG. 11B shows a state when code reading is retried.

FIG. 14 is an explanatory view showing the relationship between the posture of an article and an upper code reading unit in the code reading area.

BEST MODE FOR CARRYING OUT THE INVENTION

Embodiments of the present invention will be described below. FIG. 1 and FIG. 2A show a conveyance device 2 according to the embodiment of the present invention. A code reading device 30 according to the embodiment is incorporated in the conveyance device 2. That is, the conveyance device 2 conveys an article M from the upstream side to the downstream side, and has a code reading area 31 in its part.

Figure 4:
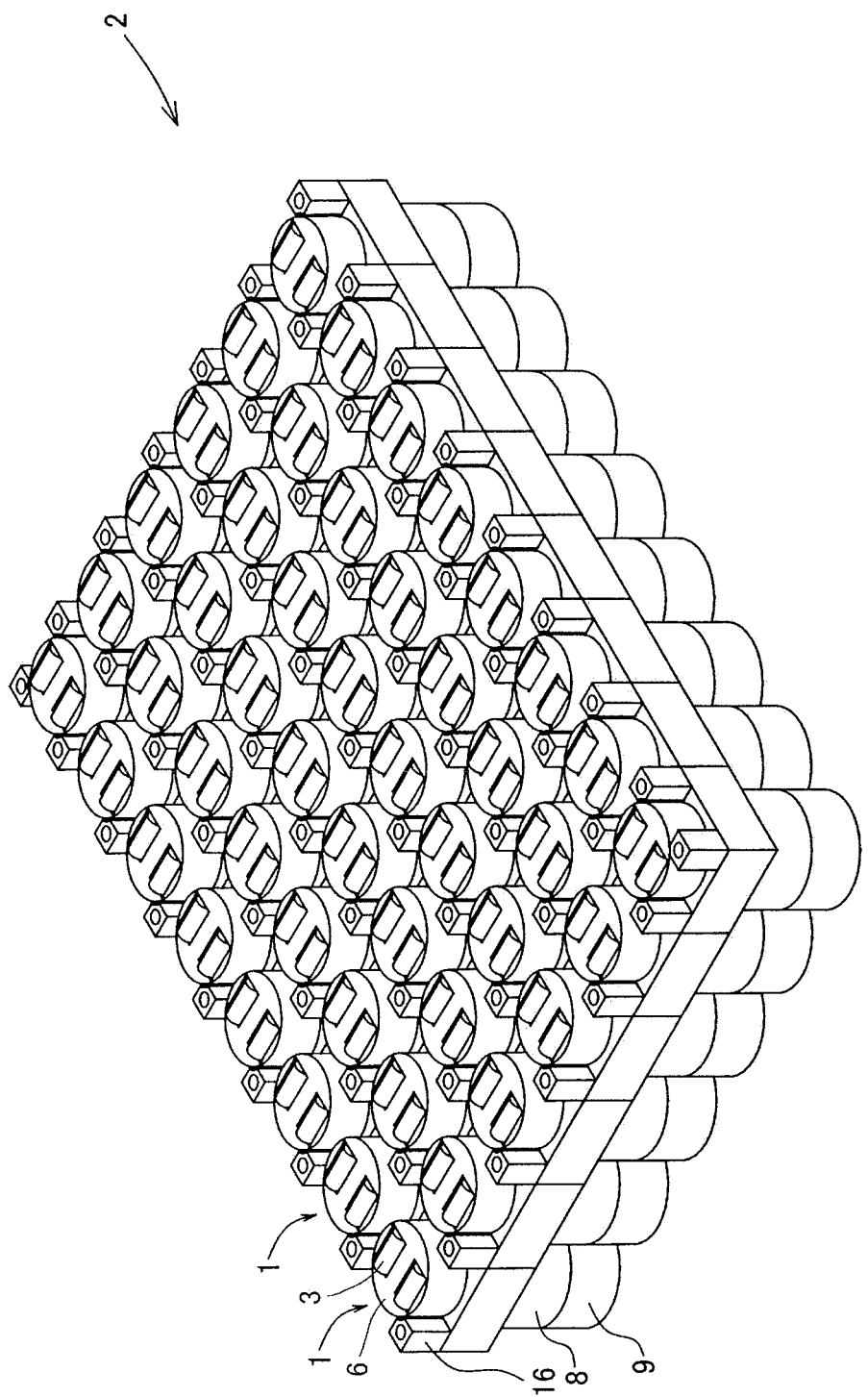
FIG. 4 is a perspective view showing a state in which a surface plate of the conveyance cell unit is removed from the conveyance device in FIG. 2.

The conveyance device 2 has an article placement surface 32 on which the article M is placed. As shown in FIG. 4, the article placement surface 32 is formed by arranging a large number of conveyance cells (motion units) 1 in a planar shape. That is, a large number of conveyance cells 1 are laid in a planar shape to constitute the conveyance device 2 having the article placement surface 32.

The conveyance cell 1 is a motion unit/article mover that causes is configured to cause an article placed on the article placement surface 32 to swivel and/or rotate on the article placement surface 32.

For illustrative convenience, FIG. 4 shows part of the conveyance device 2. In practice, the conveyance device 2 has more conveyance cells 1 than the conveyance device shown in FIG. 4.

As will be described later, the conveyance cell 1 has conveying rollers 3 and a swivel base 6 for causing the conveying rollers 3 to swivel. The conveyance cell 1 functions as a biasing unit that biases the article M. The conveyance cell 1 as the biasing unit has the conveying rollers 3 which come into contact with the bottom of the article M and move the article M, and can controllably change the biasing direction of the article M by further changing the direction of the conveying rollers 3 using the swivel base 6.

The conveyance cell 1 is configured such that the conveying rollers 3 exert a moving function of biasing and moving the article M, and the swivel base 6 exerts a biasing direction changing function (conveying direction changing function).

Figure 3:
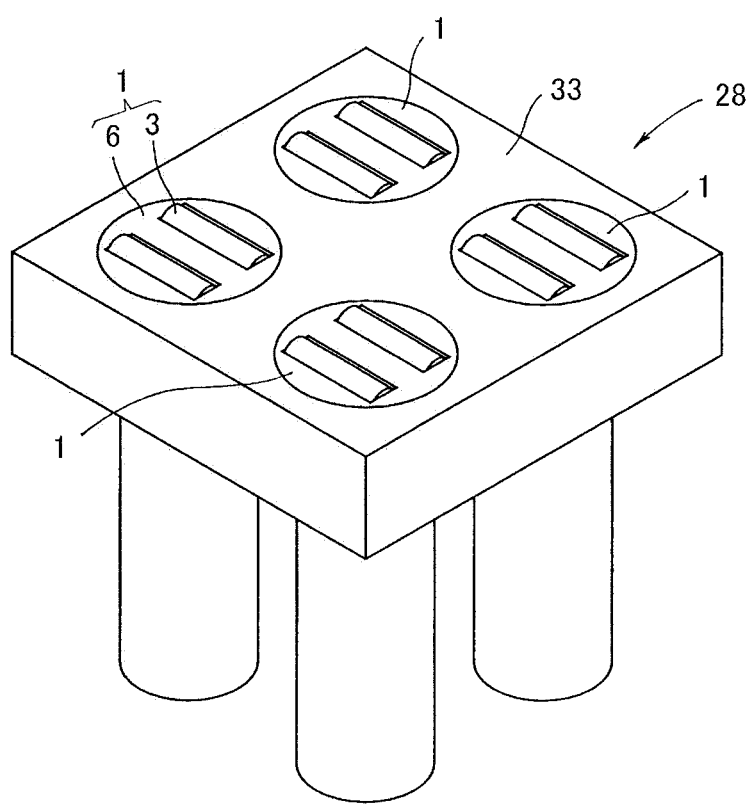
FIG. 3 is a perspective view of a conveyance cell unit.

In this embodiment, as shown in FIG. 3, four conveyance cells 1 are combined in one surface plate 33. That is, the conveyance device 2 is formed by laying conveyance cell units 28 in a planar shape.

In the conveyance cell unit 28, the front end portion of the swivel base 6 of each conveyance cell 1 and a portion of the conveying rollers 3 are exposed from the surface plate 33. The bottom of the article M comes into contact with the conveying rollers 3, and the article M receives a biasing force from the conveying rollers 3 as the conveying rollers 3 rotate. Further, the conveyance cell 1 can change the biasing direction of the article M by rotating the swivel base 6 using a swivel motor 8.

Figure 5:
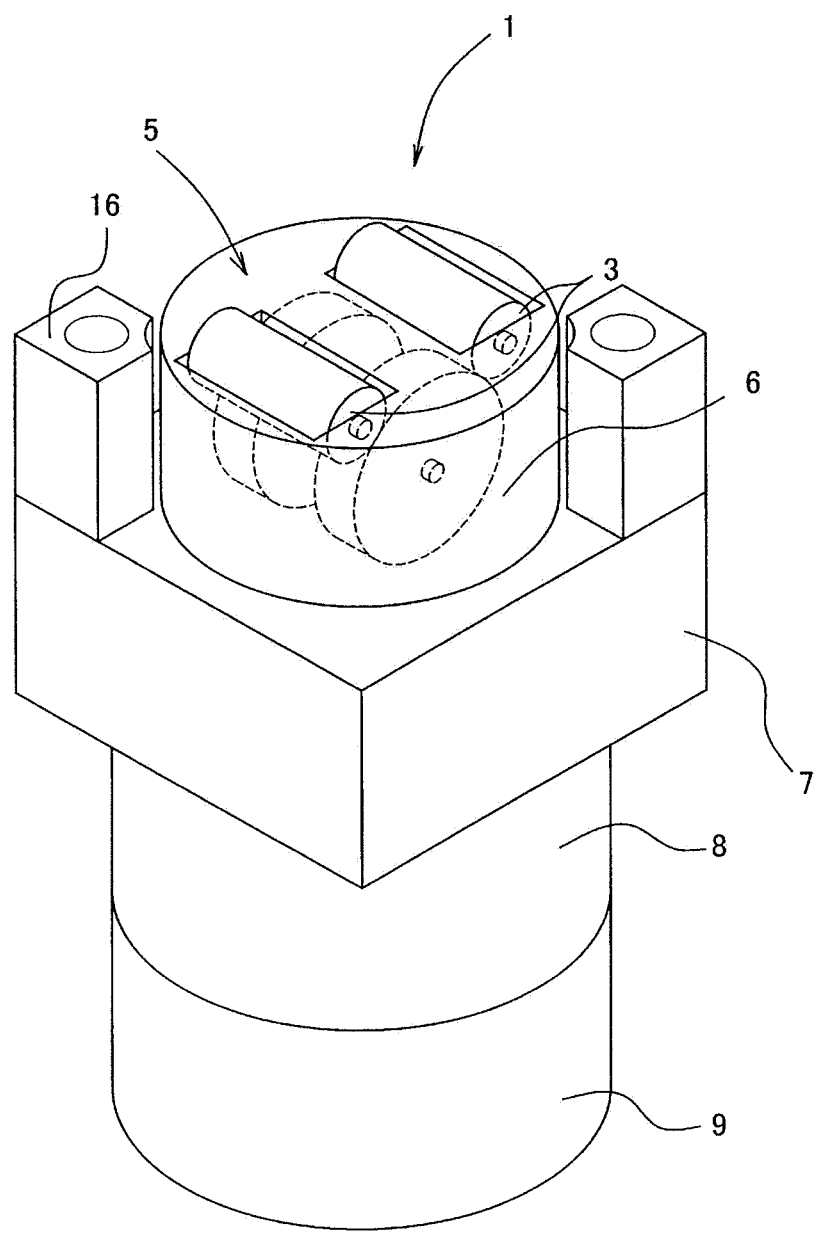
FIG. 5 is a perspective view of each conveyance cell included in the conveyance device and the conveyance cell unit in FIG. 2.

FIG. 5 shows the appearance of the conveyance cell 1.

The conveyance cell 1 has the moving function of biasing and moving the article M using the conveying rollers 3. The conveyance cell 1 is provided with a biasing direction changing unit that changes the biasing direction of the article M. Specifically, the conveyance cell 1 has the conveying rollers 3, and the article M is placed on the conveying rollers 3. The conveying rollers 3 are rotated by a running motor 9, and the bottom of the article M on the conveying rollers 3 is biased by the rotation of the conveying rollers 3 to move the article M.

Further, the conveyance cell 1 has the swivel base 6, and can change the direction of the conveying rollers 3 to change the biasing direction of the article M.

As shown in FIG. 5, the conveyance cell 1 includes a running section 5, a swivel base 6, a housing 7, the swivel motor 8, the running motor 9, and the like in the order named from the top.

The housing 7 is fixed to a fixing structure (not shown) of the conveyance device 2.

The swivel motor 8 is fixed to the housing 7. Further, the running motor 9 is fixed under the swivel motor 8.

The running section 5 is mounted on the swivel base 6. The swivel base 6 is rotatably mounted on the swivel motor 8.

Figure 6:
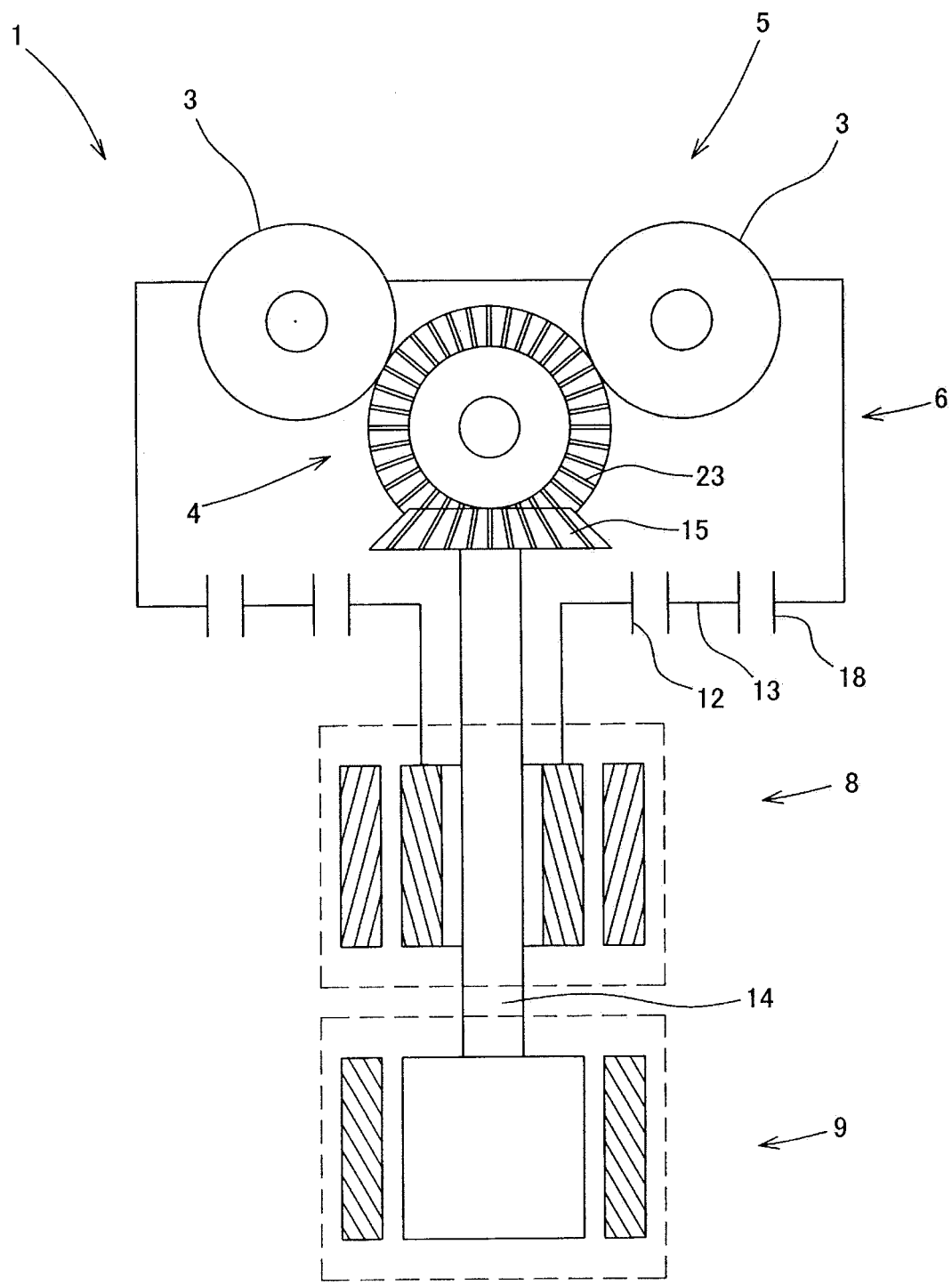
FIG. 6 is a skeleton view showing a power system of the conveyance cells in FIG. 2.
Figure 7:
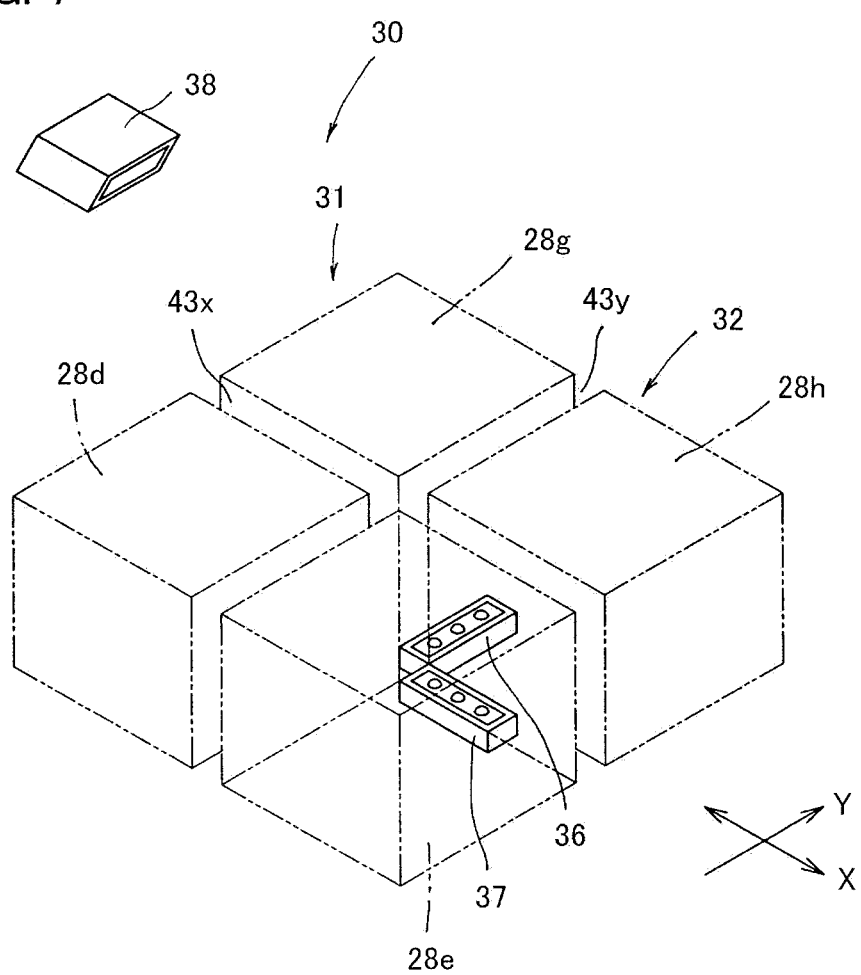
FIG. 7 is a perspective view showing the placement of an upper code reading unit and a lower code reading unit in a code reading area.
Figure 8:
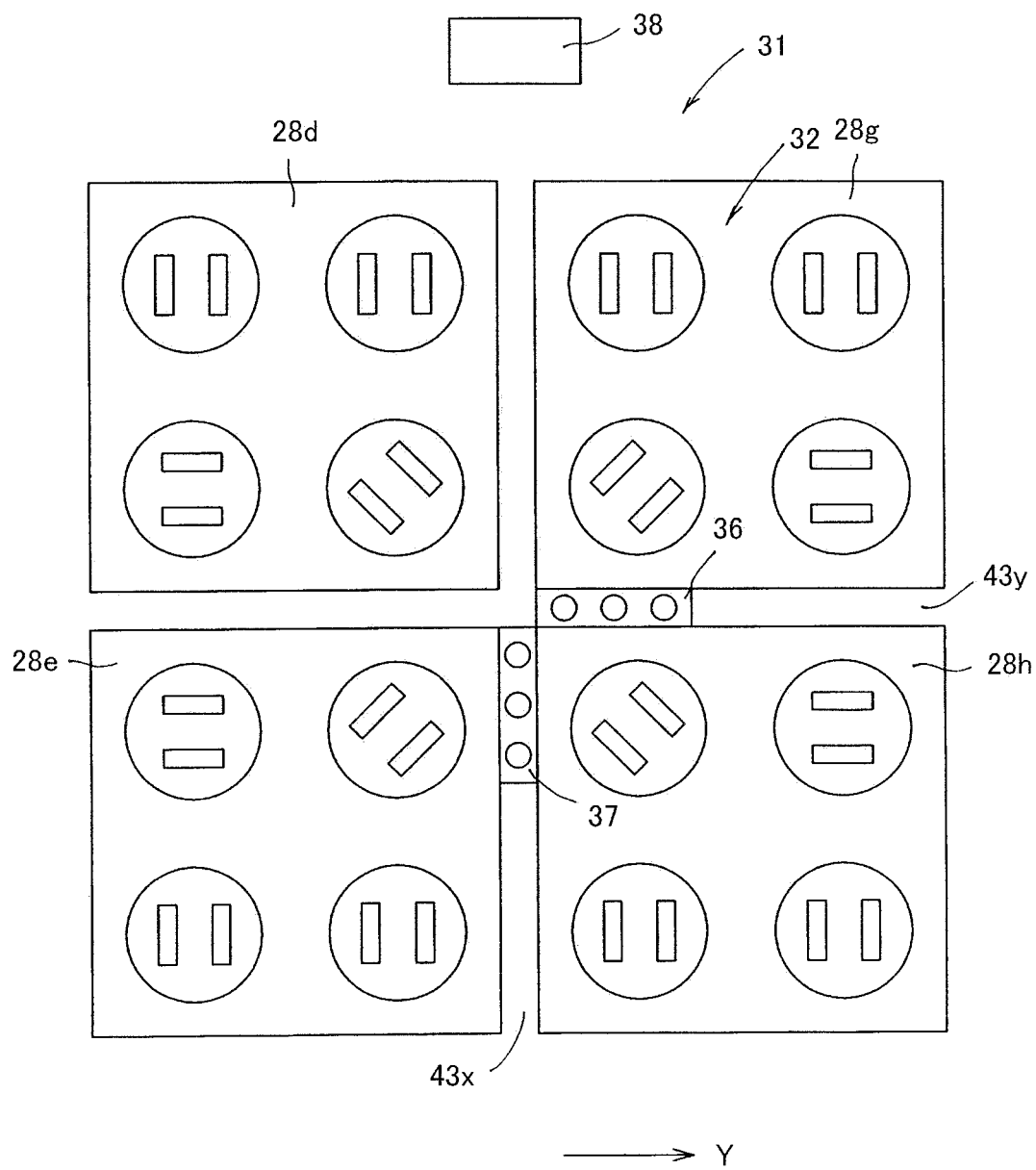
FIG. 8 is a plan view showing the placement of a lower code reading unit in the code reading area.
Figure 9:
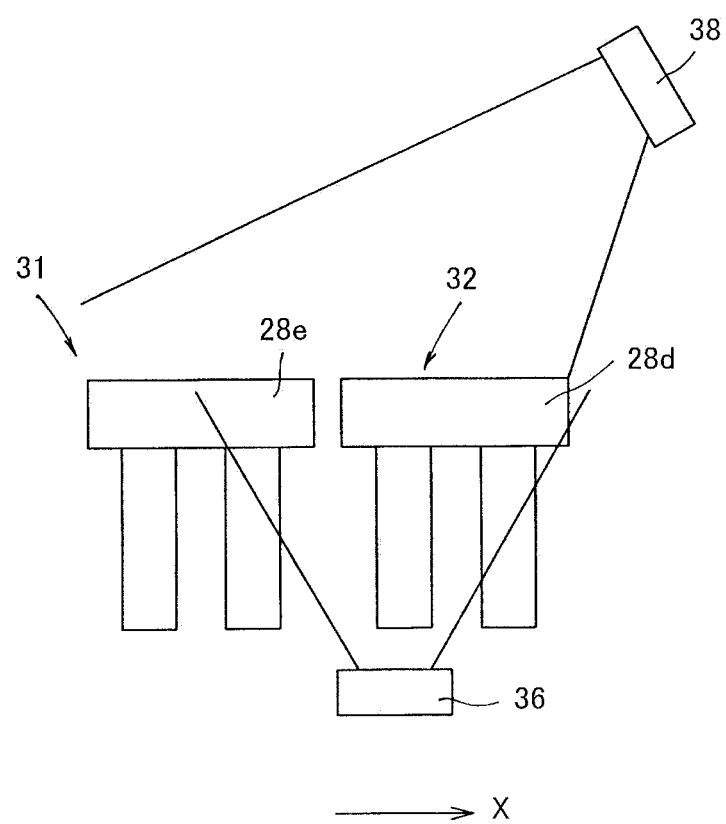
FIG. 9 is a side view showing the placement of an upper code reading unit and a lower code reading unit in the code reading area.

As shown in FIGS. 5 and 6, the running section 5 has two conveying rollers 3 (rotating bodies). The two conveying rollers 3 are rotatably supported on the swivel base 6. Further, the conveying rollers 3 are engaged with a driving roller 4.

The driving roller 4 rotates upon receiving power transmitted from a driving shaft 14 of the running motor 9 via a bevel gear portion 15 and a bevel gear portion 23. As the driving roller 4 rotates, the conveying rollers 3 rotate.

That is, the conveying rollers 3 of the running section 5 rotate upon receiving power transmitted from the running motor 9.

The swivel base 6 is a cylindrical member, and internally provided with an internal gear 18. The swivel base 6 receives rotational force transmitted from the swivel motor 8 via a gear 12, a gear 13 and the internal gear 18. Therefore, the swivel base 6 is rotated by the swivel motor 8.

As described above, the running section 5 is mounted on the swivel base 6. Accordingly, as the swivel base 6 rotates, the direction of the running section 5 changes, and the biasing direction in which the article M is biased changes.

In this manner, the conveyance cell 1 can move the article M by transmitting the rotational force of the running motor 9 to the conveying rollers 3 to rotate the conveying rollers 3 and bias the article M on the conveying rollers 3.

Further, by driving the swivel motor 8, the swivel base 6 is rotated, and the direction of the conveying rollers 3 is changed, so that the biasing direction of the article M can be arbitrarily changed.

In this manner, the conveyance cell 1 has a moving function of moving the article M and a biasing direction changing function of changing the biasing direction.

Further, the conveyance device 2 has the article placement surface 32 constituted by the front plate 33 of the conveyance cell unit 28 and the distal end of the swivel base 6 of the conveyance cell 1, and the conveying rollers 3 of the conveyance cell 1 are exposed on the article placement surface 32. Accordingly, by rotating the conveying rollers 3, the article M on the article placement surface 32 can be moved, and the biasing direction can be arbitrarily changed by rotating the swivel base 6.

The conveyance cell 1 is also provided with a load sensor 16. The load sensor 16 has a function of detecting the presence or passage of the article M. Further, the conveyance cell 1 has mutual communication means (not shown), and a signal from the load sensor 16 and the drive state of the running motor are transmitted to the adjacent conveyance cell 1.

In this embodiment, it is possible to operate the conveyance cell 1 constituting the conveyance device 2 in the intermittent operation mode. In the intermittent operation mode, the conveying rollers 3 of the conveyance cell 1 starts and stops in accordance with the placement state of the article M and the drive state of the surrounding conveyance cells 1.

In the intermittent operation mode, when the article M is present on given one of conveyance cells 1 and there is no article M on the conveyance cell 1 located ahead in the traveling direction, the running motor 9 of the given conveyance cell 1 is driven to move the article M on the given conveyance cell 1. Also, even when the conveyance cell 1 located ahead in the traveling direction is ready to convey the article M, the given conveyance cell 1 is driven to move the article M on the given conveyance cell 1.

In this embodiment, it is possible to operate the conveyance cell 1 included in the conveyance device 2 in the continuous operation mode. In the continuous operation mode, the conveying rollers 3 are driven regardless of the placement state of the article M or the like.

The conveyance device 2 according to this embodiment is formed by laying a large number of conveyance cells 1 described above. In this embodiment, six conveyance cells 1 are installed in the width direction, and a larger number of conveyance cells 1 are arranged in the longitudinal direction.

As described above, in this embodiment, one conveyance cell unit 28 is constituted by the four conveyance cells 1. Referring to FIGS. 1 and 2, the eighteen conveyance cell units 28 are arranged in three rows and six columns. For descriptive convenience, as shown in FIG. 1, reference symbols "a" to "r" are attached to the respective conveyance cell units 28.

According to FIG. 1, the conveyance device 2 according to this embodiment is formed by arranging eighteen conveyance cell units 28 ranging from the conveyance cell unit 28a to the conveyance cell unit 28r in three rows and six columns.

Figure 1A:
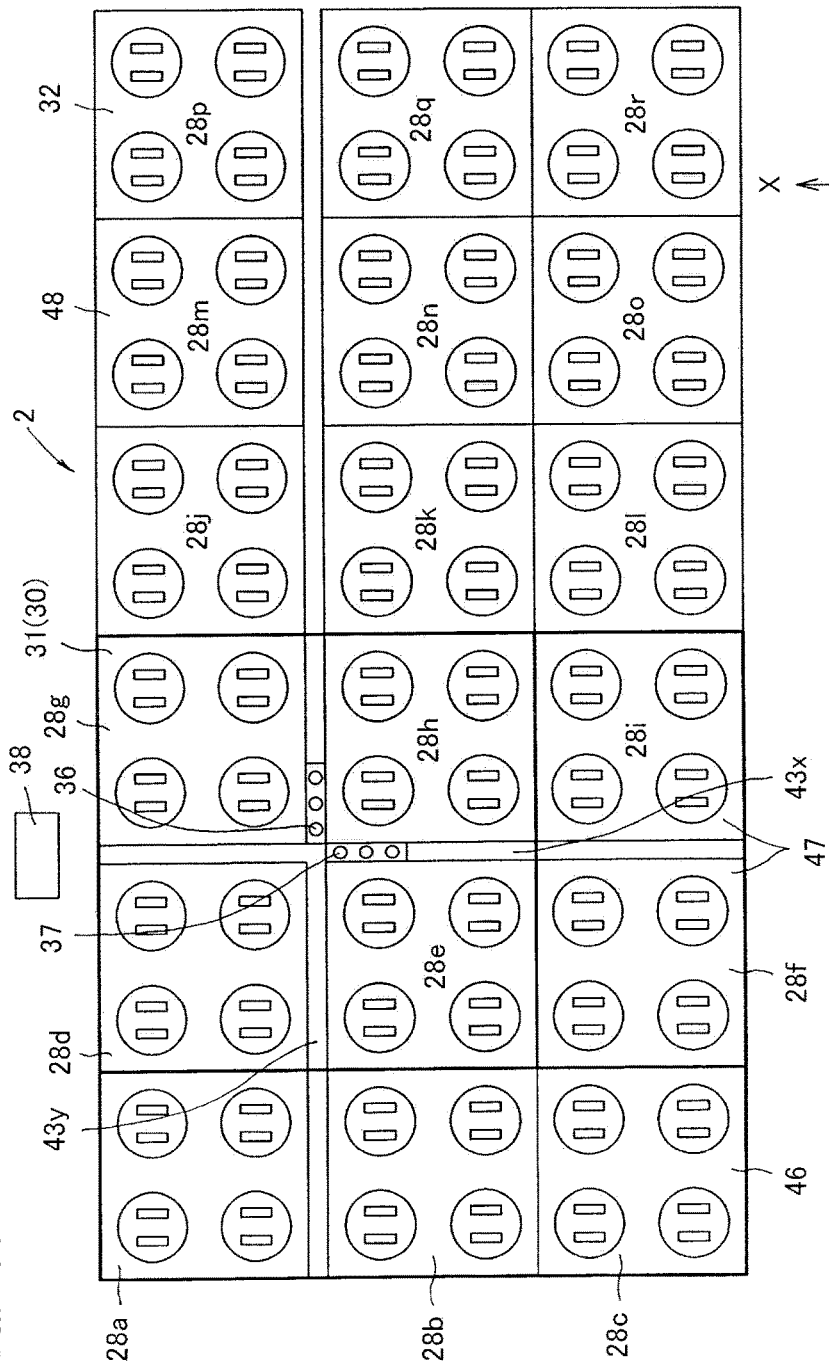
FIG. 1A is a plan view of a conveyance device (including a code reading device) according to an embodiment of the present invention.
Figure 1B:
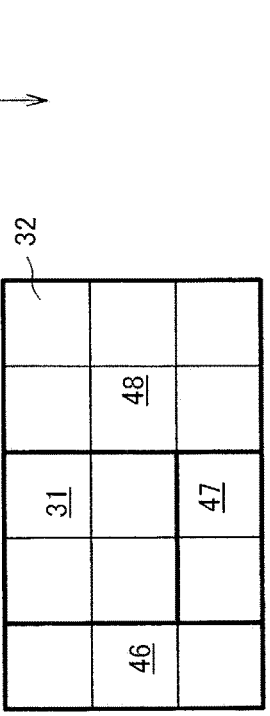
FIG. 1B is a view for explaining each area of the conveyance device.

As shown in FIG. 1B, in the conveyance device 2 according to this embodiment, the article placement surface 32 is divided into an introduction area 46, the code reading area 31, a retreat area 47, and an unloading area 48.

That is, as shown in FIGS. 1A and 1B, the introduction area 46 constituted by conveyance cell units 28a, 28b, 28c is provided at an end portion in the longitudinal direction, and there is an area located ahead, in which both the code reading area 31 and the retreat area 47 are provided.

The code reading area 31 is a square area constituted by four units including conveyance cell units 28d, 28e, 28g, and 28h.

The retreat area 47 is an area adjacent to the code reading area 31 in the width direction, and is constituted by conveyance cell units 28f and 28i.

In the conveyance device 2 according to this embodiment, there is the unloading area 48 located further ahead.

The article M is loaded into the code reading area 31 from the introduction area 46. In the code reading area 31, the article M is swiveled, and a barcode 40 attached to the article M is read. When the reading is successful, the swiveling motion of the article M is stopped, and the article M is sent to the unloading area 48 on the downstream side.

If the reading fails, the article M is temporarily sent to the retreat area 47. After being stopped in the retreat area 47 for a while, the article M is loaded into the code reading area 31 again, and reading is attempted again.

The operation and function of each area will be described below.

[Introduction Area]

The introduction area 46 is an area in which one conveyance cell unit 28 is arranged in the longitudinal direction. The introduction area 46 has a function of loading the article M into the code reading area 31.

[Code Reading Area]

In this embodiment, as shown in for example, FIGS. 1, 2, 7, and 8, the code reading area 31 is constituted by the four conveyance cell units 28d, 28e, 28g, and 28h. Lower code reading units/code readers 36 and 37 are provided under the lower part of the code reading area 31.

Further, an upper code reading unit/code reader 38 is provided at a position located on the lateral surface side of the code reading area 31 and above the article placement surface 32.

Further, an upper code reading unit 38 is provided at a position located on the lateral surface side of the code reading area 31 and above the article placement surface 32.

In this embodiment, the code reading device 30 is constituted by the four conveyance cell units 28d, 28e, 28g, and 28h, the lower code reading units 36 and 37, and the upper code reading unit 38.

In the code reading area 31, as shown in each drawing, a gap 43 is provided between the conveyance cell units 28.

The gap 43 is formed between the four conveyance cell units 28d, 28e, 28g, and 28h, and has a cross shape.

Provided that the direction of conveyance of the article M is the Y direction, the gap 43 is roughly divided into a Y direction gap 43y extending in the Y direction and an X direction gap 43x extending in the width direction.

The lower code reading units 36 and 37 are well-known scanning type barcode readers and have detecting sections. Each detecting section is a portion that emits a laser beam or the like and reads a barcode by receiving the reflected light.

The lower code reading units 36 and 37 scan a barcode 40 by, for example, linearly changing the irradiation direction of laser light.

The lower code reading units 36 and 37 are code reading units that optically read the code attached to an article.

In this embodiment, the two lower code reading units 36 and 37 have detecting sections disposed in the gap 43 between the conveyance cell units 28. Further, the scanning direction of each detecting section is along the direction in which the gap 43 extends in a planar manner.

Specifically, the scanning direction of the lower code reading unit 36 installed in the Y direction gap 43y is the Y direction. The scanning direction of the lower code reading unit 37 installed in the X direction gap 43x is the X direction. As described above, in this embodiment, the lower code reading units installed in postures in different scanning directions coexist.

The lower code reading units 36 and 37 are provided at such positions that the units look out the upper side through the gap 43.

Accordingly, when the article M swivels on the article placement surface 32 of the code reading area 31 and the bottom of the article M passes over the gap 43, detection light such as laser light strikes the bottom of the article M and is reflected to return to the detecting section. Accordingly, when the barcode 40 passes over the gap 43, the barcode 40 is read by the lower code reading units 36 and 37.

The upper code reading unit 38 is an image code reader and is a well-known wide range type barcode reader. The upper code reading unit 38 is also called an image based barcode reader, an image type code reader, or a camera type barcode reader.

The upper code reading unit 38 captures the barcode as one image. After capturing an image, the entire image is scanned with thousands of lines in the area to search for the position of the barcode, and the barcode is analyzed by an algorithm.

The upper code reading unit 38 is a code reading unit that optically reads the code attached to an article.

The upper code reading unit 38 has a wider visual field than the lower code reading units 36 and 37. If a video that has entered the visual field includes a barcode, the upper code reading unit 38 recognizes and shoots the barcode, and temporarily stores the barcode image. The upper code reading unit 38 then analyzes the image and reads the barcode.

The upper code reading unit 38 has the function of a camera. The upper code reading unit 38 is located above a side surface of the conveyance device 2, and the angle of the camera (detecting section) is inclined.

The camera (detecting section) of the upper code reading unit 38 shoots the code reading area 31 from obliquely above the code reading area 31 to monitor the presence or absence of a barcode. The upper code reading unit 38 is set at a position that enables shooting the whole area of the code reading area 31 from the code reading area 31.

As described above, in this embodiment, the code reading device 30 is configured by the four conveyance cell units 28d, 28e, 28g, and 28h, the lower code reading units 36 and 37, and the upper code reading unit 38.

The code reading device 30 performs a code reading operation, an unloading operation, and a retreating operation.

Figure 10A:
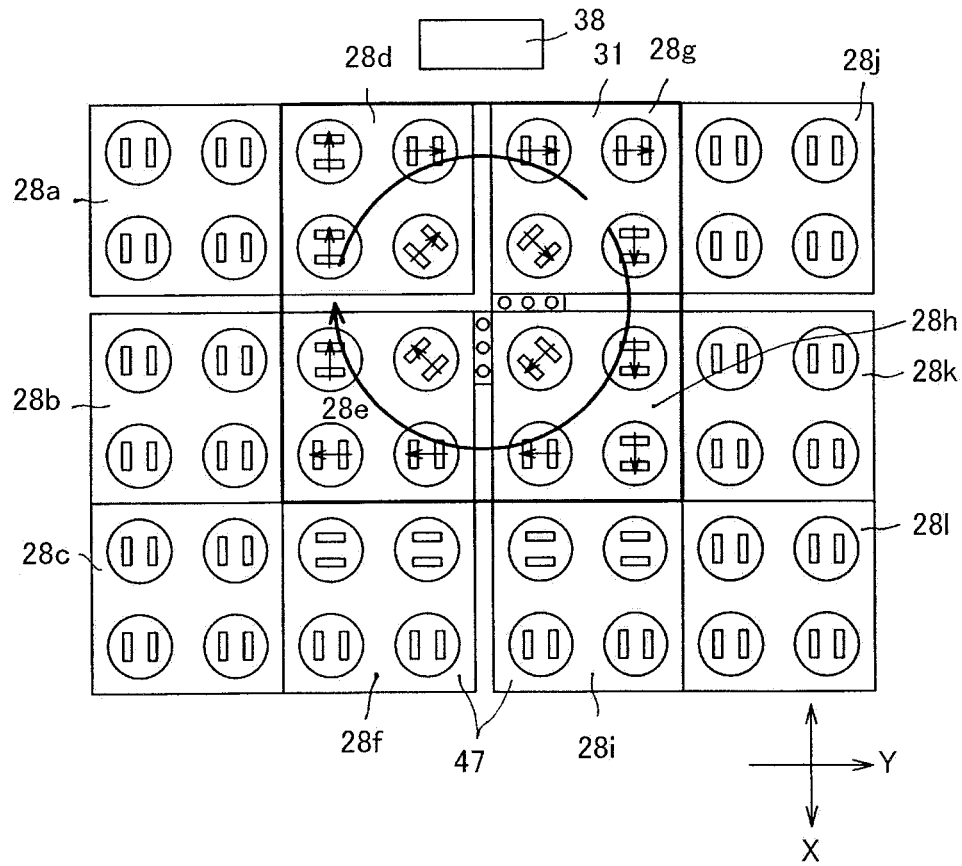

When a code reading operation is performed, as shown in FIG. 10A, each conveyance cell 1 takes an inclined posture except for some of them. The inclination angles of the respective conveyance cells 1 in the biasing direction slightly differ from each other, and the direction (small arrow) in which each conveyance cell 1 moves the article M draws multiple circles as a whole. In this embodiment, the posture of the conveying roller 3 of each conveyance cell 1 is determined so that the article M swivels around one point in the code reading area 31.

At the time of a code reading operation, the conveyance cell 1 operates in the continuous operation mode, and the conveying rollers 3 are always driven regardless of the placement state of the article M or the like.

Figure 12:
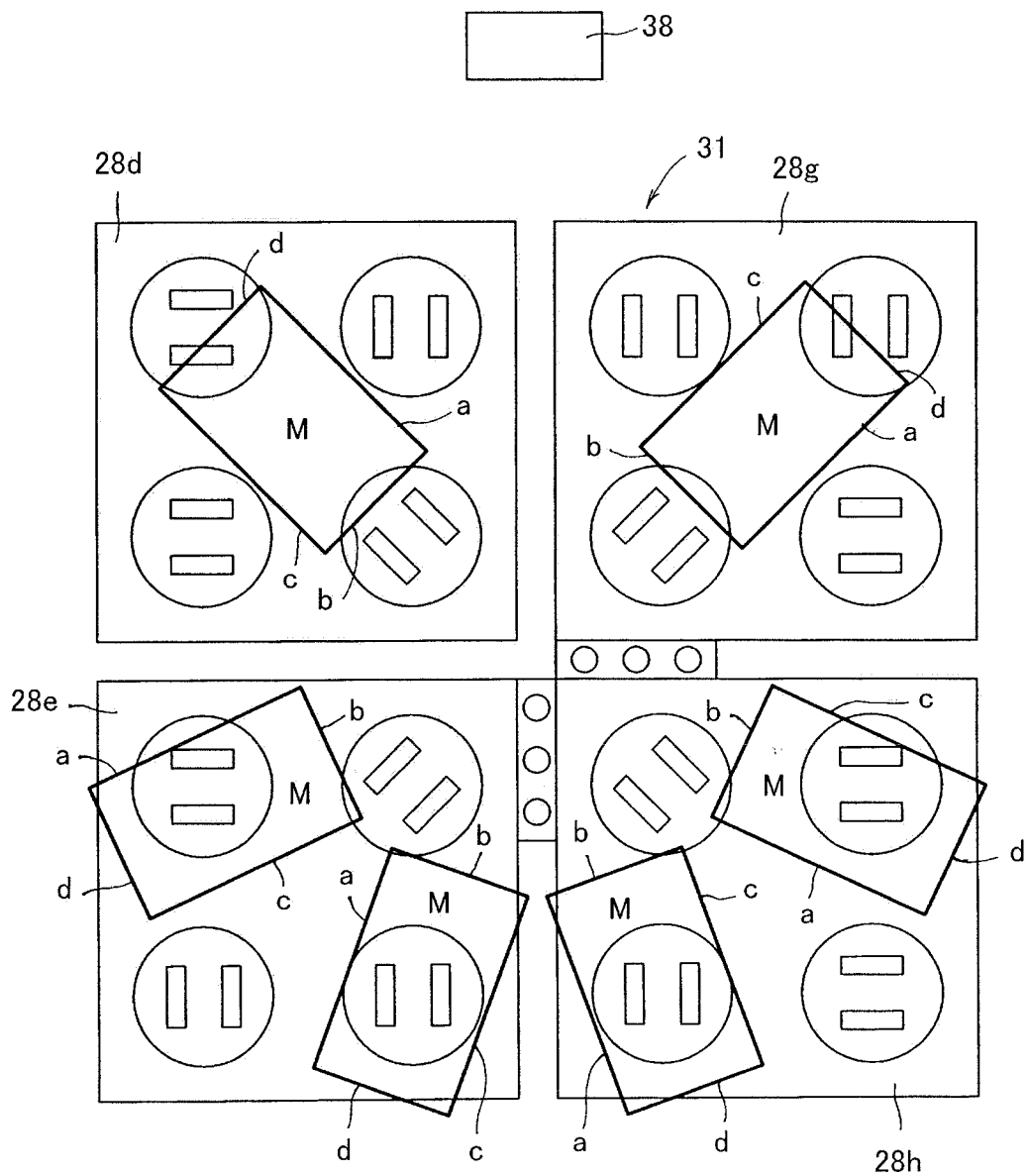
FIG. 12 is a plan view showing the movement locus of an article in the code reading area.

The article M loaded in the code reading area 31 swivels around one point like the locus shown in FIGS. 12 and 14. Also, the article M placed at the center will rotate on the spot. In this embodiment, the article M swivels or rotates clockwise.

The locus of the article M is as shown in FIG. 12, and the direction changes according to a swiveling operation. In this embodiment, four conveyance cell units 28$d$, 28$e$, 28$g$, and 28$h$ are annularly combined. Assuming that the side surfaces of the article M include an a-surface, a b-surface, a c-surface, and a d-surface, when the article M is on the conveyance cell unit 28$d$, the a-surface of the article M faces the upper code reading unit 38. When the article M is on the conveyance cell unit 28$g$, the c-surface of the article M faces the upper code reading unit 38. When the article M is on the conveyance cell unit 28$h$, the b-surface or c-surface of the article M faces the upper code reading unit 38. When the article M is on the conveyance cell unit 28$e$, the a-surface or b-surface of the article M faces the upper code reading unit 38.

In this manner, all of the surfaces of the article M face the upper code reading unit 38 at any timing during swiveling. If the barcode 40 is attached to the a-surface of the article M, when the article M is on the conveyance cell unit 28$d$, the upper code reading unit 38 detects the barcode 40, shoots it, and analyzes it.

Further, during a code reading operation, the conveyance cell 1 is operated in the continuous operation mode, and the article M swivels many times for a predetermined period of time. Accordingly, at any timing, the upper code reading unit 38 detects the barcode 40, shoots it, and analyzes it.

When the barcode 40 is attached to the upper surface of the article M like an article Mb in FIG. 2B, the upper code reading unit 38 detects the barcode 40 at any timing, shoots it, and analyzes it.

That is, in this embodiment, because the camera (detecting section) of the upper code reading unit 38 monitors the code reading area 31 from diagonally above the code reading area 31, the barcode 40 can be recognized on the upper surface of the article M, although there is some distortion.

When the barcode 40 is located on the bottom surface of the article M, the barcode 40 is read by the lower code reading units 36 and 37.

Because the lower code reading units 36 and 37 are scanning type barcode readers, a barcode is detected when the barcode is scanned in a direction parallel to the arranging direction of the line sequence of the barcode 40, whereas a barcode is difficult to read when the scanning direction of the barcode 40 intersects with the arranging direction of the line sequence.

Accordingly, in this embodiment, the lower code reading units 36 and 37 are arranged in postures in which the scanning directions intersect.

The lower code reading units 36 and 37 are provided at such positions that the detecting sections are located in the narrow gap 43 and the units look out the upper side through the narrow gap 43. Accordingly, the visual fields of the lower code reading units 36 and 37 are narrow. However, because the article M is swiveling on the article placement surface 32, the article M always passes over the gap 43 at any timing.

Figure 13A:
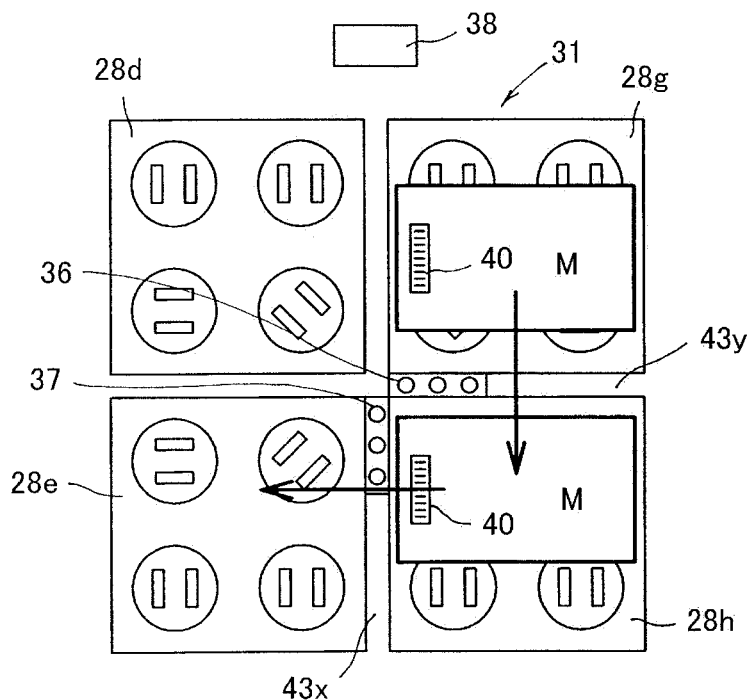
FIGS. 13A and 13B each are a view showing the relationship between the posture of an article and a lower code reading unit in the code reading area.

Further, as shown in FIG. 13A, when the article M advances from the conveyance cell unit 28$g$ toward the conveyance cell unit 28$h$ and the arrangement of the bars of the barcode enters the gap 43$y$ in a direction perpendicular to the gap 43$y$, the lower code reading unit 36 provided in the gap 43$y$ cannot read the barcode 40 of the article M.

However, at the next moment, because the article M travels from the conveyance cell unit 28$h$ to the conveyance cell unit 28$e$, the lower code reading unit 37 provided in the gap 43$x$ reads the barcode 40 of the article M at this time.

Figure 13B:
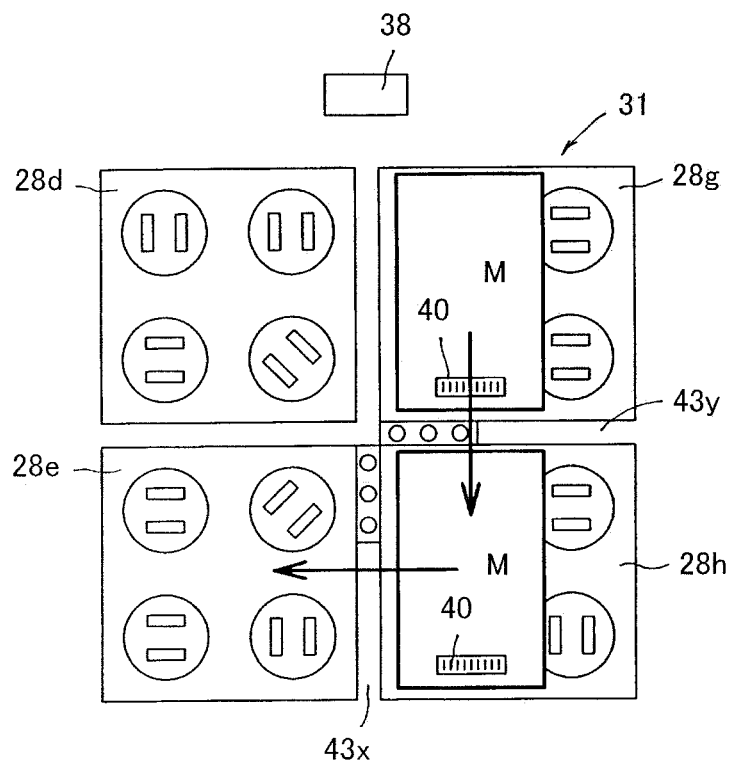

Further, as shown in FIG. 13B, when the arrangement of bars of the barcode enters the gap 43$y$ in the same direction as the direction of the gap 43$y$, the lower code reading unit 36 provided in the gap 43$y$ reads the barcode 40 of the article M.

This embodiment includes the two lower code reading units 36 and 37, which have different scanning directions. Accordingly, even if one of the lower code reading units 36 and 37 fails in reading, the other of the other lower code reading units 36 and 37 is highly likely to read the barcode 40.

In the code reading area 31, the article M swivels or rotates for a predetermined time, and an attempt is caused to read the barcode 40.

Figure 10B:
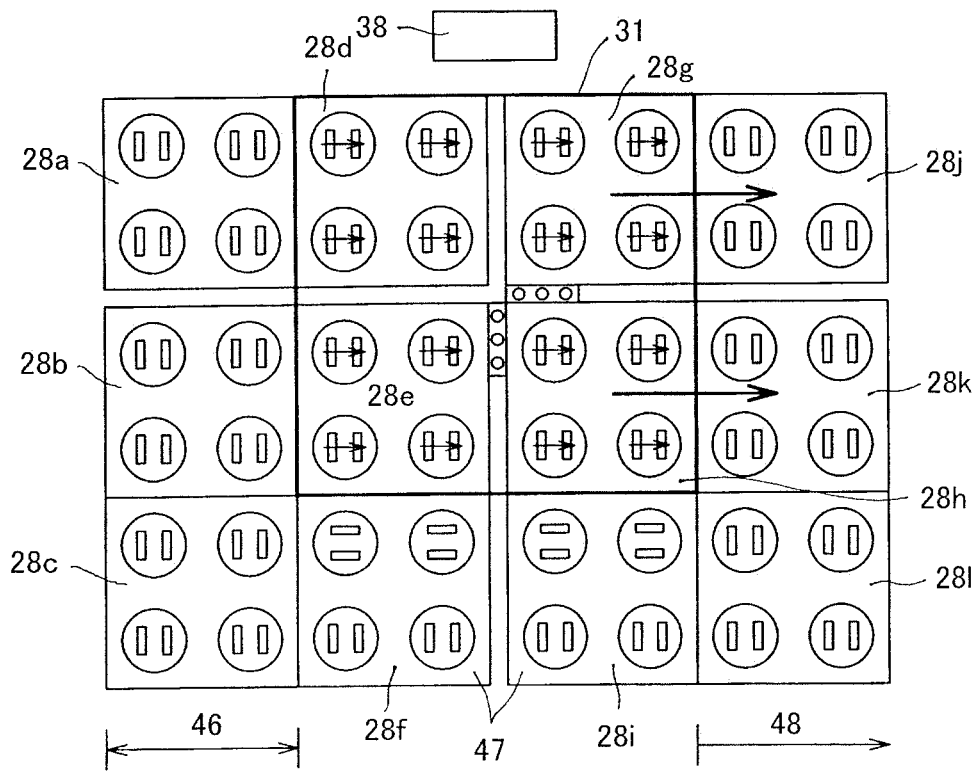

When the barcode 40 is successfully read by any one of the code reading units 36, 37, and 38, the swivel base 6 immediately rotates without waiting for the lapse of time, and as shown in FIG. 10B, the directions (small arrows) in which the conveying rollers 3 bias the article M are simultaneously changed to the direction of the unloading area 48. As a result, each article M is unloaded (discharged) to the unloading area 48 on the downstream side.

Figure 11A:
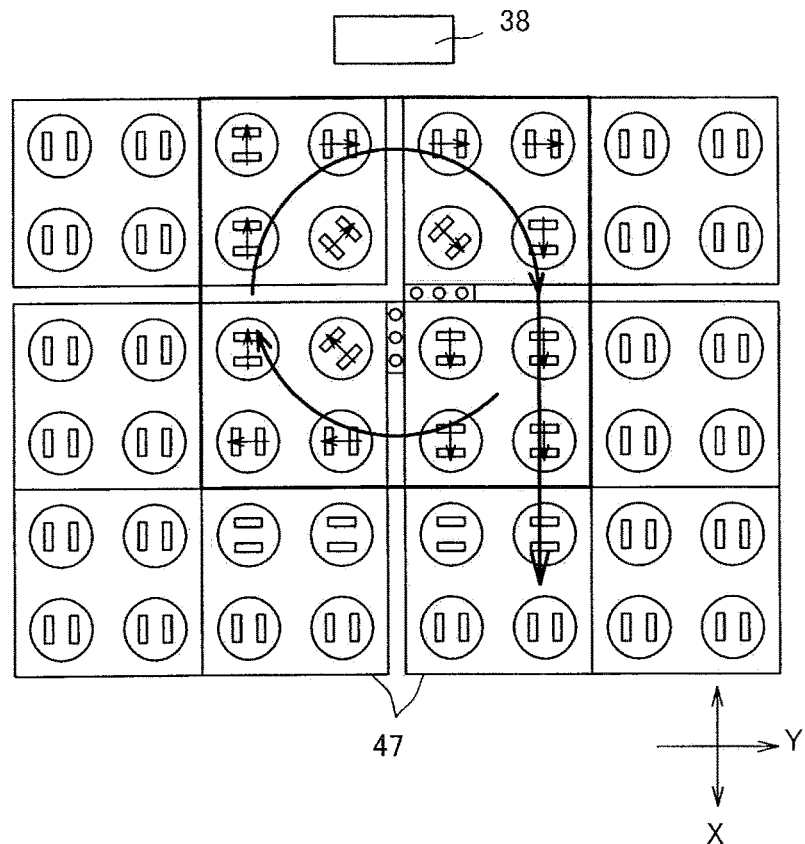

On the other hand, if the article M swivels and an attempt to read the barcode 40 for a predetermined period of time fails, the swivel base 6 immediately rotates, and as shown in FIG. 11A, the directions (small arrows) in which the article M is biased by the conveying rollers 3 are simultaneously changed to the direction of the retreat area 47. As a result, each article M is unloaded to the retreat area 47 on a side.

Figure 11B:
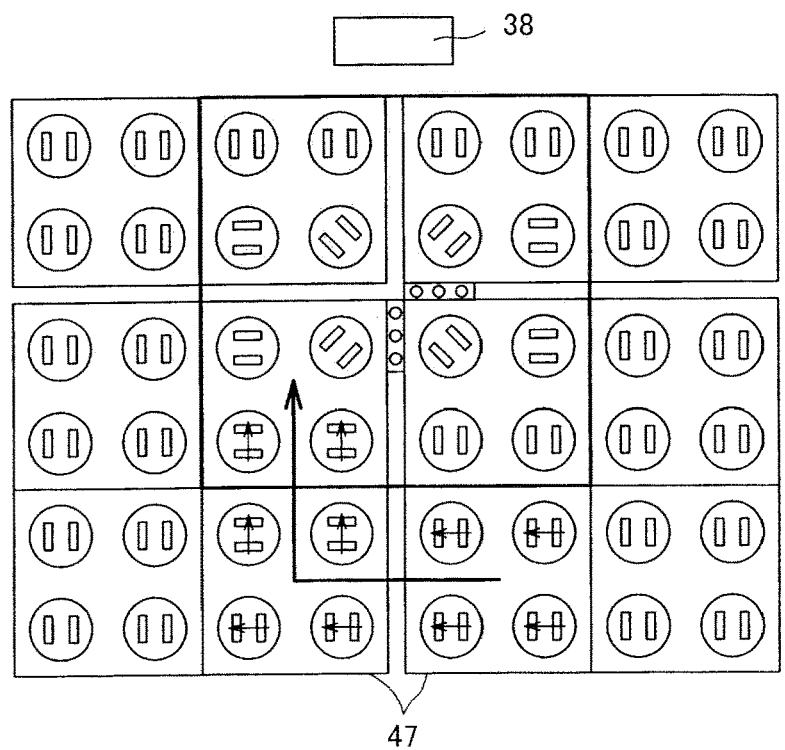

The article M is held in the retreat area 47 for a while. Subsequently, the swivel base 6 in the retreat area 47 rotates, and as shown in FIG. 11B, the directions (the small arrows) in which the article M is biased by the conveying rollers 3 are simultaneously changed to the direction of the code reading area 31. As a result, each article M returns to the code reading area 31 and is caused to swivel again to attempt to read the barcode 40.

In this embodiment, in a code reading operation, the angle of the swivel base 6 is determined so that the article M swivels around one point in the code reading area 31, and the postures of the conveying rollers 3 are set to predetermined postures. However, the article M may be caused to swivel around a plurality of points. Further, the article M may be rotated on the spot.

Further, the speed, the rotation speed, the swiveling speed, the swivel radius, and the like of the article M at the time of performing a code reading operation may be changed in accordance with the properties and quantity of the articles M.

In addition, the speed, rotation speed, swiveling speed, swivel radius and the like of the article M can be changed during a code reading operation.

Alternatively, when the article M is loaded into the code reading area 31, the article M may rotate with a small swivel radius at first and then the swivel radius may be increased.

The code reading device 30 according to this embodiment can read a code within a relatively short conveyance distance.

In the above embodiment, the upper code reading unit 38 is provided at a position located on the lateral surface side of the code reading area 31 and above the article placement surface 32. The camera (detecting section) is then set in an inclined posture and covers the upper surface and the side faces of the article M using one upper code reading unit 38.

Figure 15:
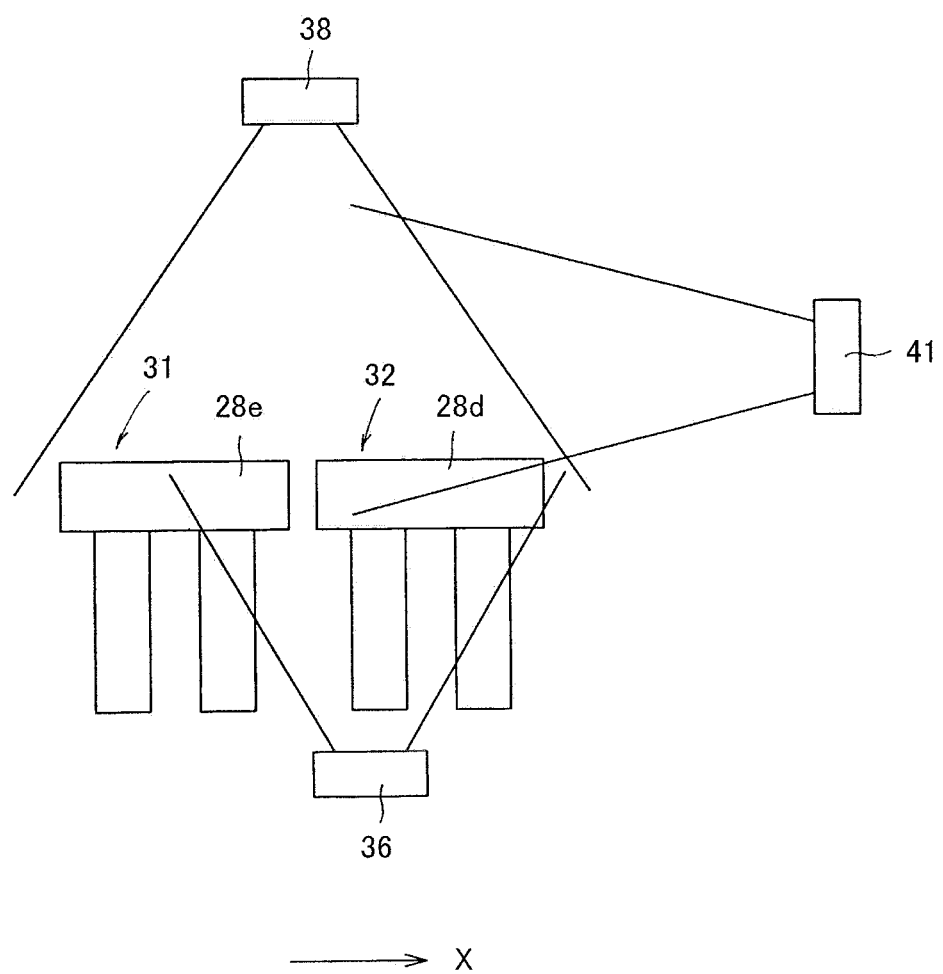
FIG. 15 is a side view showing the placement of an upper code reading unit and a side code reading unit in the code reading area.

As shown in FIG. 15, another configuration may be formed by providing the upper code reading unit 38 for detecting the barcode 40 attached to the upper surface of the article M and a side code reading unit/code reader 41 for detecting the barcode 40 attached to a side surface of the article M.

The upper code reading unit 38 may be disposed on the article placement surface 32 and faces vertically downward. The side code reading unit 41 may be attached so as to be located above the article placement surface 32 and face the substantially horizontal direction.

[Unloading Area]

The unloading area 48 is on the downstream side of the code reading area 31. The article from which the barcode 40 has been read is loaded into the unloading area 48. The article M is conveyed from the unloading area 48 to the pickup point.

For example, the destination of the article is determined from the information read by the code reading device 30, and the article is conveyed to a predetermined position by the conveyance device on the downstream side.

Alternatively, the information read by the code reading device 30 is transmitted to a higher-order control device. The higher-order control device may have the information of the barcode attached to the article M and data associating the information with the destination, and send the information from the higher-order control device to the conveyance device based on the data.

What is claimed is:

1. A code reading device comprising: an article placement surface on which an article is placed;
   at least one code reader that is configured to optically read a code attached to the article; and
   an article mover that is configured to controllably change a biasing direction of the article placed on the article placement surface which moves to thereby drive the article so as to thereby cause the article to swivel and/or rotate in a predetermined manner,
   the code reading device being configured to read the code with the at least one code reader while causing the article to swivel and/or rotate on the article placement surface,
   wherein the article mover comprises a plurality of conveyance cells arranged in a planar state, wherein each conveyance cell has a moving function of moving the article and a conveying direction change function of changing a conveying direction,
   wherein the at least one code reader includes at least one lower code reader that is configured to read the code from a lower side of the article placement surface,
   wherein the code reading device is configured to read the code with the lower code reader,
   wherein the article placement surface includes a gap, and
   wherein the lower code reader is installed in a posture to look through the gap.

2. The code reading device according to claim 1, wherein the at least one code reader includes at least one code reader that is located above the article placement surface and installed in an inclined posture.

3. The code reading device according to claim 1, wherein the at least one code reader is an image code reader.

4. The code reading device at cording to claim 1, wherein the lower code reader is a scanning type barcode reader that scans along a direction in which the gap extends.

5. The code reading device according to claim 1, wherein the at least one lower code reader includes a plurality of lower code readers, and wherein the lower code readers coexist in postures in different scanning directions.

6. The code reading device according to claim 1,
   wherein the at least one code reader includes an upper code reader and a side code reader,
   wherein the upper code reader is configured to read a barcode provided on an upper surface of the article, and
   wherein the side code reader is configured to read the barcode provided on a side surface of the article.

7. The code reading device according claim 1,
   wherein the code reading device includes a code reading area that allows the article to swivel and/or rotate, and
   wherein the code reading device is configured so that when the code is read, the article is discharged from the code reading area.

8. The code reading device according to claim 1,
   wherein the code reading device includes: a code reading area that allows the article to swivel and/or rotate; and a retreat area, and
   wherein the code reading device is configured so that when the code is not read within a predetermined time in the code reading area, the article is temporarily placed in the retreat area and returned to the code reading area afterward.

9. A code reading device comprising:
   an article placement surface on which an article is placed;
   at least one code reader that is configured to optically read a code attached to the article; and
   an article mover that is configured to controllably change a biasing direction of the article placed on the article placement surface which moves to thereby drive the article so as to thereby cause the article to swivel and/or rotate in a predetermined manner,
   the code reading device being configured to read the code with the code reader while causing the article to swivel and/or rotate on the article placement surface,
   the at least one code reader including an upper code reader and a lower code reader,
   the upper code reader being provided above the article placement surface,
   the lower code reader being configured to read the code by monitoring from below the article placement surface,
   wherein the article mover comprises a plurality of conveyance cells arranged in a planar state,
   wherein each conveyance cell has a moving function of moving the article and a conveying direction change function of changing a conveying direction,
   wherein the article placement surface includes a gap, and
   wherein the lower code reader is installed in a posture to look through the gap.

10. The code reading device according to claim 9, wherein the lower code reader is a scanning type barcode reader that scans along a direction in which the gap extends.

11. The code reading device according to claim 9,
wherein the at least one lower code reader includes a plurality of lower code readers, and
wherein the lower code readers coexist in postures in different scanning directions.

12. The code reading device according claim 9,
wherein the code reading device includes a code reading area that allows the article to swivel and/or rotate, and
wherein the code reading device is configured so that when the code is read, the article is discharged from the code reading area.

13. The code reading device according to claim 9,
wherein the code reading device includes: a code reading area that allows the article to swivel and/or rotate; and a retreat area, and
wherein the code reading device is configured so that when the code is not read within a predetermined time in the code reading area, the article is temporarily placed in the retreat area and returned to the code reading area afterward.

14. A method for reading a code attached to an article, comprising:

(a) placing the article on a surface;

(b) controllably changing a biasing direction of the article placed on the surface by moving the surface to drive the article so as to thereby cause the article placed on the surface to swivel and/or rotate in a predetermined manner;

(c) reading the code from an upper surface side and a bottom surface side of the article as the article is swiveled and/or rotated, wherein step (b) includes swiveling and/or rotating the article on an article placement surface having a gap, and wherein step (c) includes reading the code from the bottom surface side through the gap.

\* \* \* \* \*